Oct. 9, 1934.  R. E. BERG  1,975,918
VIBRATION DAMPED STRUCTURE
Filed May 3, 1932
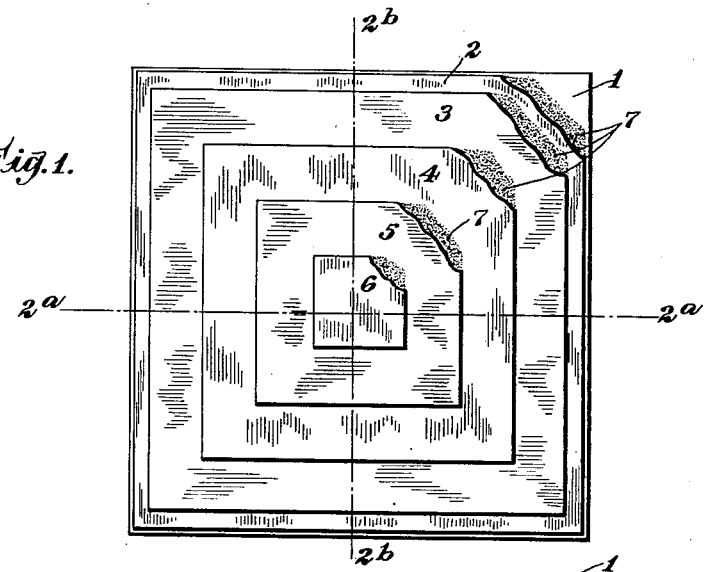
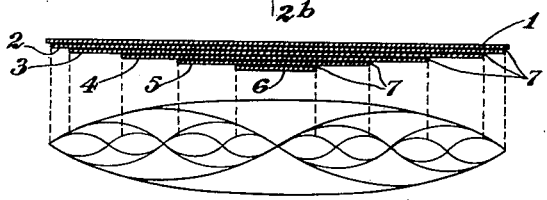
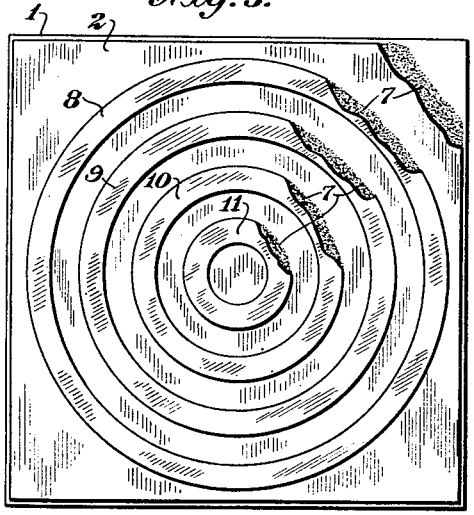
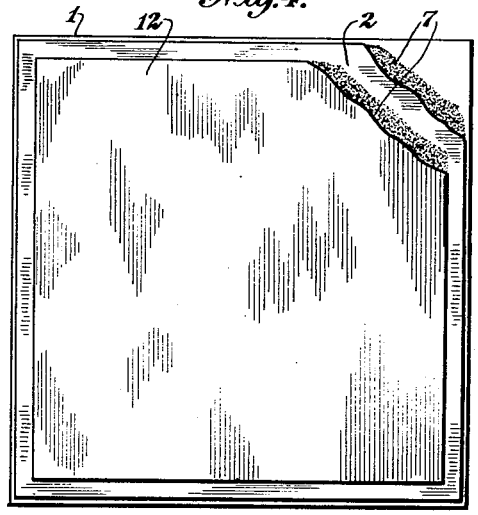
INVENTOR
Roy E. Berg.
BY D. N. Halstead
ATTORNEY Patented Oct. 9, 1934

1,975,918

UNITED STATES PATENT OFFICE 1,975,918

VIBRATION DAMPED STRUCTURE

Roy E. Berg, Chicago, Ill., assignor to Johns-Manville Corporation, New York, N. Y., a corporation of New York Application May 3, 1932, Serial No. 608,912

10 Claims. (Cl. 154—43)

This invention relates to a vibration damped structure and particularly to one in which a vibratile member is damped by means of a plurality of overlying sheets. The invention relates especially to such a structure in which the several overlying sheets have areas that decrease with the distance from the vibratile member.

The need of vibration damping may be illustrated in the case of the sheet steel in an automobile body. When the automobile is moving at high speed, there will be considerable vibration with the production of undesired sound, unless the sheet metal is damped in certain positions, as, for example, in the doors or back of the front seat.

It will be understood that when a vibratile sheet is subjected to vibratory impulses of sufficient intensity and duration there will result vibrations. The sheet will come to have nodal and antinodal positions or areas, within which the extent or amplitude of the vibration from the normal position of rest will vary. Thus, the amplitude will be greatest at the antinodal positions or areas and least at the nodes.

The shape of the nodal and antinodal areas will vary with a number of factors. In some cases, points of equal amplitude of vibration in a vibrating sheet or disc may be joined by lines that are circular. A section of a vibrating sheet along a straight line extending from one side to the other, may show a vibration pattern something like that of a vibrating string. It is known that a string in vibration shows major and minor nodes and antinodes, as will be discussed in more detail later. Likewise, a vibrating sheet will show major and minor nodes and antinodes, in a formation that may be more or less like a series of spaced rings.

In order to minimize the undesirable vibrations of sheet material, such as metal, of automobile bodies, railway cars, or other structures subjected to vibratory impulses, there is adhered, to the sheet material, non-vibratile damping material such as a felted fibrous sheet. I have now discovered means of increasing the effectiveness of vibration damping by means of such material by using it in the form of a plurality of sheets of differing areas.

A preferred embodiment of the invention is illustrated in Figures 1 and 2 and modifications thereof are illustrated in Figures 3 and 4.

Fig. 1 is a plan view of a vibration damped structure with portions broken away for clearness of illustration.

Fig. 2 shows a cross section along the section lines 2a—2a, or 2b—2b of Fig. 1. Fig. 2 also shows, on an exaggerated scale, a graphic representation of vibrations that may be present in the section.

Fig. 3 shows a plan view, with portions broken away for clearness of illustration, of a modification in which some of the layers of vibration damping material are in the form of rings.

Fig. 4 shows a plan view, with portions broken away for clearness of illustration, of a modification of the invention in which the face of the vibration damping material distant from the vibratile member is adhered to a relatively heavy, mass-adding member.

In the various figures, like reference characters denote like parts. Thus, 1 is a vibratile member, as, for example, a thin sheet of wood or metal such as tinned steel, 2 is a non-vibratile damping material, suitably in preformed sheet form, adhered on one face continuously to the vibratile member, and 3, 4, 5 and 6 are sheets of material placed back of the material 2, that is, to the side of the material 2 distant from the vibratile member 1. The sheets 3, 4 and 5 are preferably constructed of vibration damping material of the same kind as sheet 2. The outer sheet of the assembly, in this case 6, may be of the same material or different, say of heavy, mass-adding material. The sheet 2 is juxtaposed and, advantageously, adhered continuously to the vibratile member, and the other sheets are adhered to sheet 2, or to each other, by means of cementing material 7, as illustrated.

In the lower part of Fig. 2 there is a simple diagrammatic illustration of a type of vibration that might prevail in a vibrating sheet, along the section lines 2a—2a or 2b—2b of Fig. 1, if there were no damping of the vibrations. Thus there may be vibration with the primary nodes at the outer portions or edges of the sheet and the primary antinodal position, or position of greatest amplitude of vibration, at the central portion. Also, there may be minor vibrations with nodes spaced one-half, one-fourth or one-eighth, etc., as far apart as the primary nodes at the edge of the sheet, as illustrated in the figure. There may be other vibrations than those illustrated. Also, the vibrations will probably not be as regular or as simply related as those described and illustrated. Further, the amplitude of vibration at a given point will be a resultant of major and minor vibrations. Regardless of the exact configuration of the nodal and antinodal positions or areas, it can be assumed that a plurality of such positions and areas does exist. They may be determined roughly by experiment, as, for example, by forming sand patterns by a well known method.

Fig. 2 illustrates in section the positioning of a plurality of sheets of vibration damping material so that the thickness of the damping material is the greatest over the area of the sheet that has the greatest amplitude of vibration. Further, there is illustrated a pyramiding of a plurality of preformed sheets of the vibration damping material overlapping each an antinodal position, as the antinodal positions appear in progression from the edge to the central portions of the vibrating member, the greatest thickness of damping material occurring at the central portion of the said member. The areas of the several sheets of damping material decrease with an increase in the distance of the sheets from the vibratile member.

In the modification shown in Fig. 3, the vibratile member is adhered as before, to a sheet 2 of vibration damping material. To the back of this sheet 2 there is adhered a series of independent rings 8, 9, 10 and 11. These rings may be concentric, are spaced from each other, and are positioned to overlie antinodal positions, such, for example, as the eight minor antinodal areas illustrated in the lower part of Fig. 2. The rings are secured to the underlying vibratile material, as by the cementing layer 7. If desired, the several rings, like the damping assembly shown in Figs. 1 and 2, may be of increasing thickness from the outer to the central member, so that the thickness or mass of vibration damping material over the various areas may be proportional approximately to the average amplitudes of vibration in those areas that would prevail if there were no damping of the vibration.

In the structures of the invention illustrated in Figs. 1, 2 and 3, greater effectiveness of damping of vibration is secured for a given amount of vibration damping material used than in a conventional structure in which the vibration damping material has uniform thickness over the damped surface.

While it is not necessary to explain this unexpected result, it may be that the explanation resides in part in considerations advanced above and in part in such a distribution of the mass of the vibrating structure as to set up interfering vibrations which partially neutralize each other. Also, inertia and relatively great thickness of damping material are provided at the optimum location, namely over the central portion of the vibratile member.

It should be understood that the number of overlying units of damping material may be varied. Thus, one wishing only moderate vibration damping at a reduced cost of construction might use something less than the six separate sheets or units of damping material shown in Figs. 1 and 2. There might be used, for example, two or more units, say three to five. Likewise one wishing a particularly effective damping, regardless of the initial costs, might use a number of units greater than six.

If the units of vibration damping material are of equal thickness, the thickness of the individual units and the number of overlying units determine the range of thickness of such material that is possible in a structure. There have been used structures in which the vibration damping material overlying the central portion of the vibratile member is at least twice and frequently three to five or six times as thick as at the outer or edge portions of the vibratile member.

The specific positioning and areas of the several juxtaposed sheets of vibration damping material that gives approximately optimum results in damping vibrations of a given vibratile member of any kind or shape can be determined, in view of the disclosures above, by a few simple tests. Thus the sand-pattern of the vibrations may be determined, if the member is flat and can be laid in a horizontal position, covered with a thin layer of sand, and subjected to vibratory impulses to produce vibration similar to that which will prevail when the member is in use; the damping material is then placed in greater thickness over the antinodal areas thus indicated. A simpler and usually more practicable method is to test one vibratile member of a particular kind or shape, of which a large number are to be damped. With the test member, various assemblies of the sheets of damping material are adhered to the vibratile member, until an assembly giving the best results is indicated. This assembly is then used on other members of the same kind.

A modification of the invention, in which a plurality of overlying sheets coact to damp the vibrations of the vibratile member, is illustrated in Fig. 4. The structure comprises the vibratile member 1, vibration damping material 2 adhesively secured to the vibratile member, by means of a cementing layer 7, and a sheet 12 adhered similarly to the face of the vibration damping material that is distant or away from the vibratile member. In other words, there is a sandwich-like structure with damping material enclosed between two members and suitably continuously adhered to both. The sheet 12 is for the purpose of adding mass or inertia to the structure. It consists of relatively dense material, preferably non-vibratile sheet metal, such as lead or tin foil.

The sheet may be of area smaller than that of the damping material, to provide a greater mass over the central portions of the vibratile member than over the outer portions.

The effect of the mass-adding members of felted material, metal, or the like, overlying the first sheet of vibration damping material, on the face thereof that is distant from the vibratile member, may be due in part to the stiffening effect of these members.

Once the desirable effects of the structure shown in Fig. 4 have been observed, an explanation may be advanced. Thus, it may be stated that, in damping of vibrations, the energy removed from the vibrating member goes partly to do work upon the damping material. This work may consist in part in compressing the damping material, as the vibrating member moves towards the damping material, and alternately expanding it, as the vibrating member moves away from the damping material, all in one vibration cycle. At the same time, there is probably some displacement of the damping material as a whole, first to one side and then to the other. A means of adding mass or inertia at a favorable position would minimize the displacement of the damping material and, by so doing, hold it more firmly against the vibrating member, in position for increased alternate compression and expansion. Such means are provided by the heavy member 12.

The mass-adding or inertia-increasing member, being on the face of the damping material distant from the vibratile member, does not decrease the compressibility or expansibility of the damping material between the mass-giving member and the vibratile member 1.

The vibration damping material may be of conventional construction or composition. Thus, it may consist of a fabric such as a woven product of the nature of burlap or thick, soft cloth. However, the preferred type of damping material is a felted, fibrous sheet that is partially but not completely saturated with a viscous liquid impregnating material. Thus I have used to advantage a felt containing approximately four pounds of rag fibers to one of cellulosic fibers, such as newsprint, and impregnated with asphalt in the proportion of approximately 100 to 130 parts by weight of asphalt for each 100 of fibers. Such a product is compressible and expansible to a satisfactory degree, is moisture proof, and has substantial inertia. It does not show bleeding of the asphalt when subjected for a short time to an elevated temperature, such as 300° F. On the other hand, the product is not brittle or rigid at temperatures as low as —20° F. The proportion of asphalt used may be varied somewhat with the porosity of the felt which is impregnated, but should be substantially less than the amount of asphalt required for complete saturation of the felt. Satisfactory results have been obtained by use of a product containing asphalt in proportion substantially less than, say 40 to 70%, preferably 50 to 60% of, the amount of asphalt that may be contained in the felt at complete saturation. The thickness of the asphalt-impregnated felted fibrous sheet may be varied to suit the conditions of use. A thickness that has been used to advantage is approximately 0.05 to 0.06 inch.

The cementing layer used in the structure should be such as to withstand temperatures as high as 300° F., for a short time, without loosening of a felt from the vibratile member to which adhered by the cement, and on the other hand, should not be brittle and should not crack during use in the vibration damped structure at temperatures as low as —20° F.

Many variations from the illustrative details that have been given may be made without departing from the scope of the invention. It is intended, therefore, that the invention should be limited only by the terms of the claims.

What I claim is:

1. In a vibration damped structure including a vibratile member with central and outer portions and vibration damping material juxtaposed over the said central and outer portions, the improvement comprising vibration damping material in greater thickness over the central portion than over the outer portions of the vibratile member.

2. In a vibration damped structure including a vibratile member with central and outer portions and a plurality of preformed sheets of vibration damping material adhered to the said central and outer portions, the improvement comprising vibration damping material adhered to the central portion of the vibratile member in greater thickness than to the outer portion of the member.

3. In vibration damped structure including a vibratile member with central and outer portions and a plurality of preformed sheets of vibration damping material adhered to the said central and outer portion, the improvement comprising vibration damping material adhered to the central portion of the vibratile member in thickness at least twice as great as the thickness on the outer portion of the member.

4. In a vibration damped structure including a vibratile member with central and outer portions and a plurality of preformed sheets of vibration damping material adhered to the said central and outer portions, the improvement comprising vibration damping material adhered to the central portion of the vibratile member in thickness three to six times as great as the thickness on the outer portion of the sheet.

5. In a vibration damped structure comprising a vibratile member adapted to vibrate with the creation of nodal and antinodal areas and vibration damping material adhered to the vibratile member over the said nodal and antinodal areas, the improvement comprising damping material adhered to the vibratile member in greater thickness over the antinodal than over the nodal areas.

6. In a vibration damped structure compirsing a vibratile member adapted to vibrate with an amplitude that is greater in the central than in the outer portions of the member and vibration damping material adhered to the said central and outer portions, the improvement comprising damping material adhered to the vibratile member in greater thickness in the portions of greater amplitude of vibration than in those of lesser amplitude.

7. In a vibration damped structure including a vibratile member of substantial area and preformed vibration damping material adhered thereto, the improvement comprising vibration damping material in the form of several overlying sheets adhesively secured to each other, the areas of the several sheets decreasing with increasing distance from the vibratile member.

8. In a vibration damped structure including a vibratile member of substantial area and preformed vibration damping material adhered thereto, the improvement comprising vibration damping material in the form of several overlying sheets of compressible and expansible, felted, fibrous material impregnated with a material of the type of asphalt in proportion substantially less than required for saturation, the several sheets being continuously adhered to each other and having areas that decrease with increase in the distance from the vibratile member.

9. A vibration damped structure comprising a vibratile member, a sheet of vibration damping material adhered to the vibratile member, and a mass-adding unit attached to the face of the said sheet distant from the vibratile member, the mass-adding unit being of smaller area than the sheet of vibration damping material.

10. The vibration damped structure comprising a vibratile member, a sheet of vibration damping material adhered to the vibratile member, and a mass-adding and stiffening unit attached to the face of the said sheet distant from the vibratile member, the mass-adding and stiffening unit being of smaller area than the sheet of vibration damping material.

ROY E. BERG.